(12) United States Patent
Dudley et al.

(10) Patent No.: US 8,751,394 B2
(45) Date of Patent: Jun. 10, 2014

(54) SYSTEM AND METHOD FOR ENHANCED TRANSACTION SECURITY

(75) Inventors: William H. Dudley, Lovettsville, VA (US); Marc R. Landrum, Centerville, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 624 days.

(21) Appl. No.: 12/276,539

(22) Filed: Nov. 24, 2008

(65) Prior Publication Data

US 2009/0138391 A1 May 28, 2009

Related U.S. Application Data

(60) Provisional application No. 60/990,652, filed on Nov. 28, 2007.

(51) Int. Cl.
G06Q 40/00 (2012.01)
G06Q 20/04 (2012.01)

(52) U.S. Cl.
CPC ..................................... G06Q 20/04 (2013.01)
USPC ............... 705/44; 705/325; 705/38; 705/319; 705/75; 235/375; 713/168; 455/558; 726/21

(58) Field of Classification Search
USPC .................. 705/1–45, 325, 319, 75; 455/407; 235/375; 713/168; 726/21
See application file for complete search history.

(56) References Cited

U.S. PATENT DOCUMENTS

| | | | |
|---|---|---|---|
| 8,352,360 B2 * | 1/2013 | De Judicibus et al. | 705/39 |
| 2002/0143634 A1 * | 10/2002 | Kumar et al. | 705/18 |
| 2003/0119478 A1 * | 6/2003 | Nagy et al. | 455/408 |
| 2003/0154139 A1 * | 8/2003 | Woo | 705/26 |
| 2004/0030659 A1 * | 2/2004 | Gueh | 705/67 |
| 2005/0107067 A1 * | 5/2005 | Redecker | 455/407 |
| 2005/0250538 A1 * | 11/2005 | Narasimhan et al. | 455/558 |
| 2005/0256802 A1 * | 11/2005 | Ammermann et al. | 705/44 |
| 2006/0016878 A1 * | 1/2006 | Singer et al. | 235/380 |
| 2006/0111081 A1 * | 5/2006 | Whittington et al. | 455/411 |
| 2006/0213968 A1 * | 9/2006 | Guest et al. | 235/375 |
| 2006/0253339 A1 * | 11/2006 | Singh et al. | 705/26 |
| 2006/0294025 A1 * | 12/2006 | Mengerink | 705/77 |
| 2007/0094113 A1 * | 4/2007 | Chapeta | 705/35 |
| 2007/0244807 A1 * | 10/2007 | Andringa et al. | 705/38 |
| 2007/0282756 A1 * | 12/2007 | Dravenstott et al. | 705/72 |
| 2008/0227391 A1 * | 9/2008 | Rosenberg | 455/41.1 |

* cited by examiner

*Primary Examiner* — Tien Nguyen
(74) *Attorney, Agent, or Firm* — Kenyon & Kenyon LLP

(57) ABSTRACT

As individuals increasingly engage in different types of transactions they face a growing threat from, possibly among other things, identity theft, financial fraud, information misuse, etc. and the serious consequences or repercussions of same. Leveraging the ubiquitous nature of wireless devices and the popularity of (SMS, MMS, etc.) messaging, an infrastructure that enhances the security of the different types of transactions within which a wireless device user may participate. The infrastructure may optionally leverage the capabilities of a centrally-located Messaging Inter-Carrier Vendor.

19 Claims, 6 Drawing Sheets

SYSTEM AND METHOD FOR ENHANCED TRANSACTION SECURITY

This application claims the benefit of U.S. Provisional Patent Application Ser. No. 60/990,652, filed on Nov. 28, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), etc.

2. Background of the Invention

As the 'wireless revolution' continues to march forward the importance to a Mobile Subscriber (MS)—for example a user of a Wireless Device (WD) such as a mobile telephone, a BlackBerry, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities.

Coincident with the expanding presence of WDs has been the explosive growth of messaging—a steady annual increase, year over year, in the number of (SMS, MMS, etc.) messages that have been exchanged by and between WDs. That steady increase shows no sign of abating. For example, as reported by the industry group CTIA (see ctia.org on the World Wide Web [WWW]) in the U.S. there were over 158 billion SMS messages sent during 2006 (representing a 95% increase over 2005) and there were over 2.7 billion MMS messages sent during 2006 (representing a 100% increase over 2005).

Concurrent with the positive progress that the 'wireless revolution' has enjoyed society has, sadly, suffered significant negative progress. Among other things as individuals increasingly engage in different types of transactions (such as, possibly inter alia, the facilitation, completion, etc. of a payment element of, for example, an on-line purchase; an account status [e.g., balance, available credit, etc.] inquiry; a funds or money transfer operation; etc.) over different channels or mediums (such as, for example, the WWW, etc.) with different organizations (such as, possibly inter alia, utility companies, financial institutions, on-line retailers, etc.) they face a growing threat from, possibly inter alia, identity theft, financial fraud, information misuse, etc. and the serious consequences or repercussions of same. For example, a study by Utica College's Center for Identity Management and Information Protection (CIMIP) that included among other things an extensive review of U.S. Secret Service case files found that the median actual dollar loss for identity theft victims was $31,356.

The specific examples that were described above are illustrative only and it will be readily apparent to one of ordinary skill in the relevant art that numerous other examples are easily possible and indeed are fully within the scope of the present invention.

Given (1) the ubiquitous nature of WDs, (2) the popularity of (SMS, MMS, etc.) messaging, and (3) an expanding universe of threats it would be desirable to leverage WD-based messaging to enhance the security of the different types of transactions within which a MS may participate through the innovatory addition of an artifact that the ATM Industry Association (ATMIA) has described as "an inexpensive and tried-and-tested method of authenticating a . . . customer's identity for . . . transactions"—i.e., a Personal Identification Numbers (PIN).

The present invention facilitates such enhanced transaction security in new, creative, and unconventional ways and addresses various of the not insubstantial challenges that are associated with same.

SUMMARY OF THE INVENTION

In one embodiment of the present invention there is provided a method for enhanced transaction security, including receiving from a WD of a MS a request message, the request message indicative of a transaction involving a third-party; performing one or more processing steps on aspects of the request message, using at least in part (a) information from the request message, (b) registration information previously supplied by the mobile subscriber, and (c) information previously obtained about the third-party, yielding one or more security policies; generating, based at least on aspects of the one or more security policies, a PIN; preserving at least the PIN in a repository; and generating a response message to the mobile subscriber, the response message containing at least the PIN.

In accordance with the embodiment the MS may use the PIN in the transaction—through for example (a) manual entry, (b) Near Field Communication, (c) infrared communication, or (d) BlueTooth communication—and the third-party may interact with the repository to at least confirm the PIN.

Still in accordance with the embodiment the request message and the response message may each be (a) a Short Message Service message, (b) a Multimedia Message Service message, (c) an IP Multimedia Subsystem message, or (d) an E-Mail message.

Still in accordance with the embodiment, the PIN may be (a) generated randomly, (b) generated through a predefined algorithm or formula, or (c) generated sequentially.

Still in accordance with the embodiment, the method may employ information previously supplied by a MS.

In another embodiment of the present invention there is provided a method for enhanced transaction security, including receiving from a third-party an indication of a transaction, the indication at least identifying a participant in the transaction; performing one or more processing steps on aspects of the indication, using at least in part (a) information from the indication, (b) registration information previously supplied by the participant, and (c) information previously obtained about the third-party, yielding one or more security policies; generating, based at least on aspects of the one or more security policies, a PIN; preserving at least the PIN in a repository; and generating a response message to a wireless device of the participant, the response message containing at least the PIN.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the description that may be found below, further serve to illustrate among other things the principles, structure, and operation of such embodiments. Variations of these embodiments will be apparent to persons of ordinary skill in the relevant art based on the teachings contained herein.

It should be understood that these figures depict embodiments of the invention. Variations of these embodiments will be apparent to persons skilled in the relevant art(s) based on the teachings contained herein.

DETAILED DESCRIPTION

The present invention may leverage the capabilities of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same.

Figure 1:
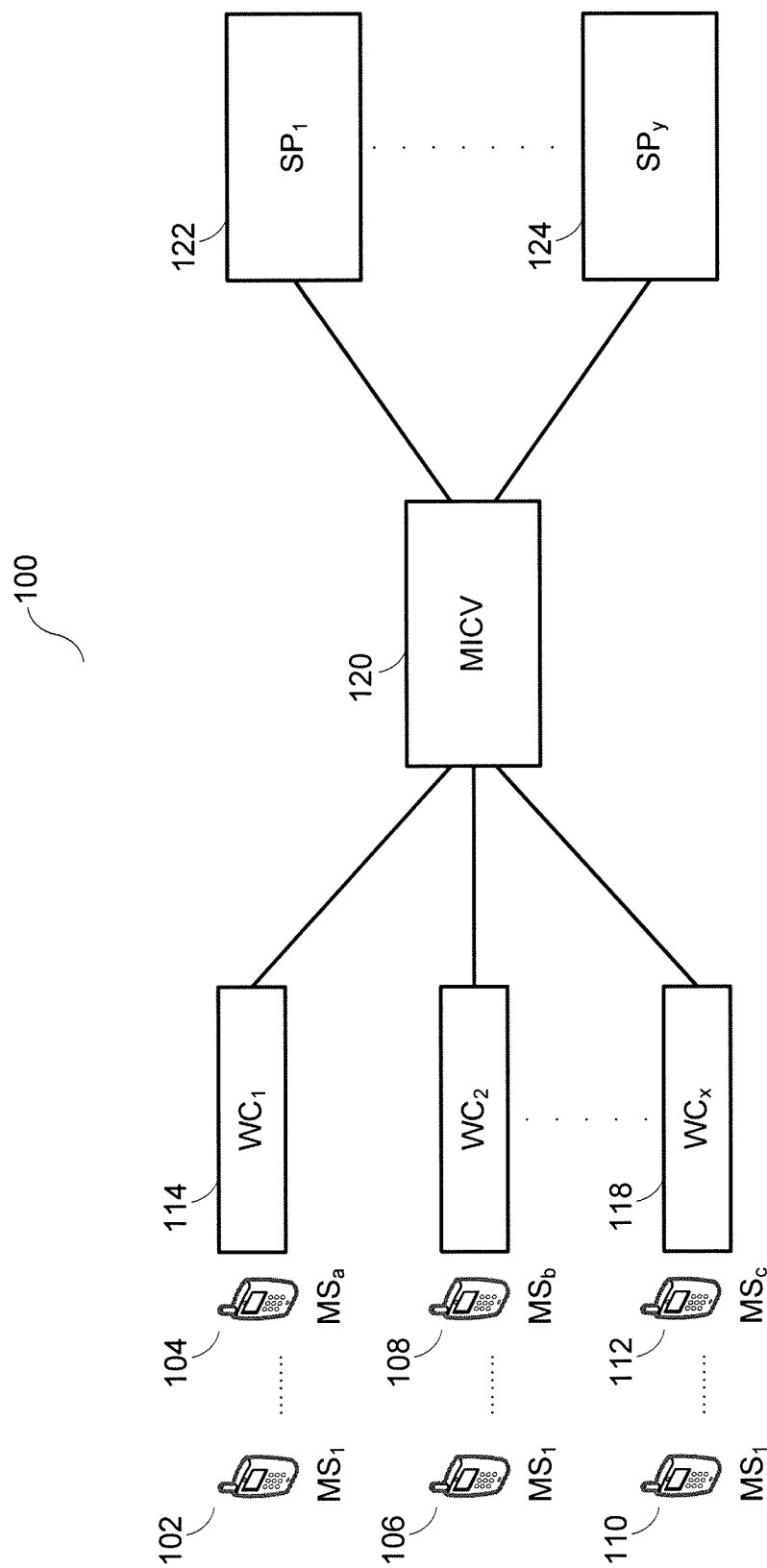
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs (WC$_1$ 114→WC$_x$ 118) on one side and multiple SPs (SP$_1$ 122→SP$_y$ 124) on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below the present invention is described and illustrated as being offered by a SP. A SP may, for example, be realized as a third-party service bureau, an element of a WC or a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP SP$_x$ offers a service that has been enhanced or augmented as provided through aspects of the instant invention and Mary, a MS, uses SP$_x$'s service.

Figure 2:
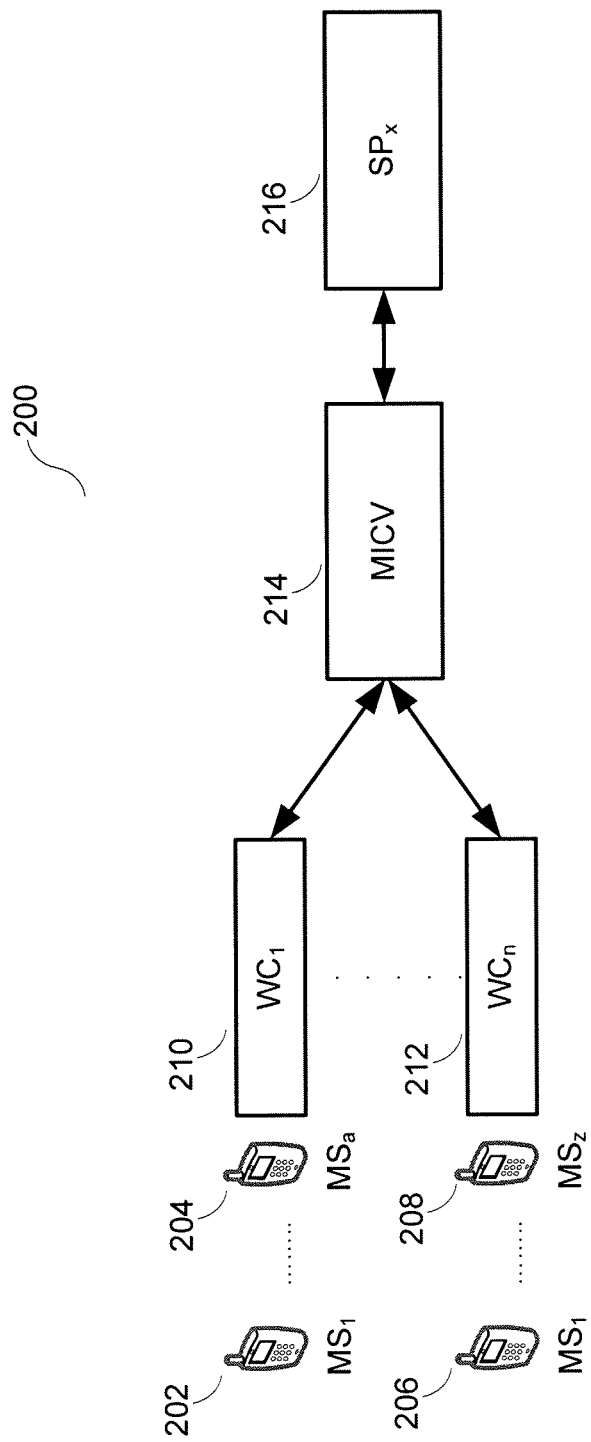
FIG. 2 illustrates one particular arrangement that is possible through aspects of the present invention.

FIG. 2 and reference numeral 200 depict one particular arrangement that may be possible under our hypothetical example. As indicated, all of the messaging traffic of numerous MSs (MS$_1$ 202→MS$_a$ 204 and MS$_1$ 206→MS$_z$ 208, including Mary), serviced by various WCs (W$_1$ 210→WC$_n$ 212), is exchanged with a MICV 214 and the MICV 214 is connected with SP$_x$ 216 (a SP that offers, possibly inter alia, aspects of the present invention).

Figure 3:
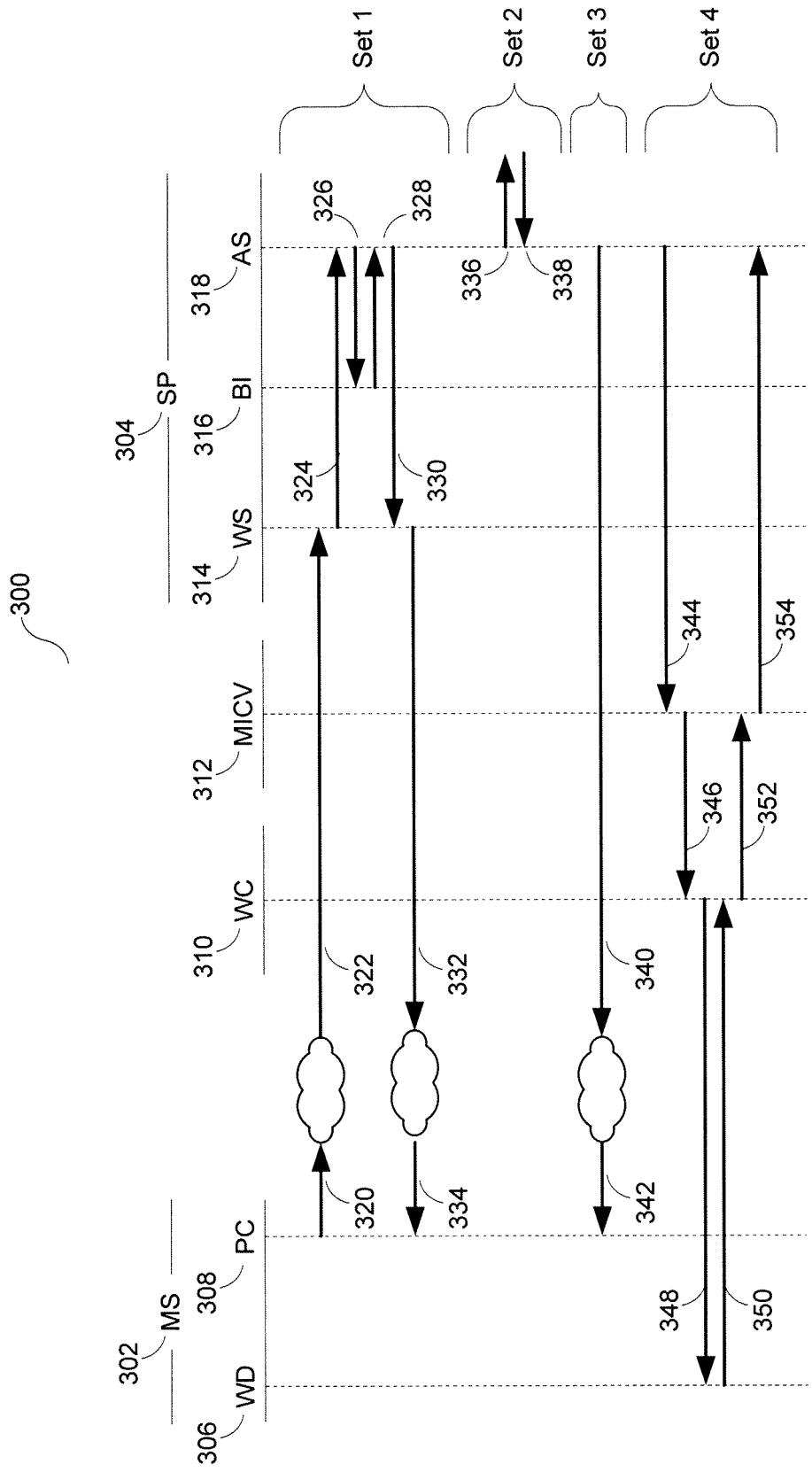
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. A registration process may be tailored (e.g., the range of information gathered, the scope of services subsequently offered, etc.) to the class of user—e.g., possibly inter alia different types, categories, etc. of users may complete different registration processes. Of interest and note in the diagram are the following entities:

MS 302 WD 306. For example, Mary's WD such as mobile telephone, BlackBerry, PalmPilot, etc.

MS 302 Personal Computer (PC) 308. For example, a home, work, etc. PC of Mary 302.

WC 310. The provider of service for a WD 306 of Mary 302.

MICV 312. As noted above the use of a MICV, although not required, provides significant advantages.

SP 304 Web Server (WS) 314. A publicly-available WWW site that is optionally provided by SP$_x$ 304.

SP 304 Billing Interface (BI) 316. A single, consolidated interface that SP$_x$ 304 may use to easily reach, possibly inter alia, one or more internal and/or external entities such as a credit card or debit card clearinghouse, a carrier billing system, a service bureau that provides access to multiple carrier billing systems, invoicing or billing facilities, etc.

SP 304 AS 318. Facilities that provide key elements of the instant invention (which will be described below).

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with $SP_x$ 304:

A) Mary 302 uses one of her PCs 308 to visit a WS 314 of $SP_x$ 304 to, possibly among other things, complete a service registration process (320→322).

B) A WS 314 of $SP_x$ 304 interacts with an AS 318 of $SP_x$ 304 to, possibly among other things, commit some or all of the information that Mary 302 provided to a data repository (e.g., a database), optionally complete a billing transaction, etc. (324).

C) As appropriate and as required a BI 316 completes a billing transaction (326→328).

D) After receiving a response from an AS 318 of $SP_x$ 304 (330) a WS 314 of $SP_x$ 304 responds appropriately (e.g., with the presentation of a confirmation message, etc.) (332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW (via, for example, a Web site that is operated by $SP_x$), wireless messaging (SMS, MMS, etc.), Electronic Mail (E-Mail) messages, Instant Messaging (IM), conventional mail, telephone, Interactive Voice Response (IVR) facility, etc.

During the registration process described above a range of information may be captured from a MS including, possibly inter alia:

A) Identifying Information. For example, possibly among other things, name, address, age, landline and wireless Telephone Numbers (TNs), E-Mail addresses, IM names/identifiers, a unique identifier and a password, etc.

B) Account Information. For example, possibly among other things, various of the particulars for one or more of a MS' accounts (with organizations such as, possibly inter alia, utility companies, financial institutions, on-line retailers, etc.). The particulars may include, possibly inter alia, organization name and contact details, account number, account access credentials, etc.

C) Security Service Information. For example, possibly among other things, the selection of one or more of the different security plans, programs, etc. that a SP may optionally offer (each of which may carry, possibly inter alia, some type of fee or charge). Such plans, programs, etc. may provide, possibly inter alia, alerts to a MS (via, for example, SMS, MMS, E-Mail, IM, etc.) based on various events, criteria, thresholds, etc.; additional levels of notification, confirmation, etc. during a transaction; etc.

D) Billing Information. For example, the particulars (such as, possibly inter alia, name, number, etc.) for financial institution (bank, brokerage, etc.) accounts, credit cards, debit cards, etc. As well, possibly the selection of one or more of the different service billing models may be offered by a SP (including, inter alia, a fixed one-time charge, a recurring [monthly, etc.] fixed charge, a recurring [monthly, etc.] variable charge, a per-transaction charge, etc.) and possibly the selection of one or more of the different payment mechanisms that may be offered by a SP (including, possibly among other things, credit or debit card information, authorization to place a charge on a MS's phone bill, authorization to deduct funds from a MS' [bank, brokerage, etc.] account, etc.).

The specific pieces of information that were described above are illustrative only and it will be readily apparent to one of ordinary skill in the relevant art that numerous other pieces of information (e.g., additional Identifying Information, scheduled daily/weekly/etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may be augmented by $SP_x$ to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, inter alia:

1) The appearance of a line item charge on the bill or statement that a MS receives from her WC. Exemplary mechanics and logistics associated with this approach are described in pending U.S. patent application Ser. No. 10/837, 695 entitled "SYSTEM AND METHOD FOR BILLING AUGMENTATION." Other ways of completing or performing line item billing are easily implemented by those skilled in the art.

2) The charging of a credit card or the debiting of a debit card.

3) The (electronic, etc.) transfer of funds.

4) The generation of an invoice, statement, etc.

In FIG. 3 the exchanges that are collected under the designation Set 2 represent the activities that might take place as $SP_x$ 304 optionally coordinates, etc. with one or more external entities to, possibly among other things, secure access, confirm collected information, arrange to receive updates, etc. (see 336→338).

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as an AS 318 of $SP_x$ 304 dispatches to Mary 302 one or more confirmation E-Mail messages (340→342).

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 3 the exchanges that are collected under the designation Set 4 represent the activities that might take place as an AS 318 of $SP_x$ 304 dispatches one or more confirmation SMS, MMS, etc. messages to a WD 306 of Mary 302 (344→348) and Mary 302 optionally replies or responds to the message(s) (350→354). Of interest and note are:

1) In the instant example the messages are shown traversing a MICV 312.

2) The SP 304 may employ a Short Code (SC) or a regular TN as its source address (and to which it would ask users of its service to direct any reply messages). While the abbreviated length of a SC (e.g., five digits for a SC administered by Neustar uder the Common Short Code [CSC] program) incrementally enhances the experience of a MS 302 (e.g., the MS 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, the registration information that was described above may subsequently be managed (e.g., existing information may be edited or removed, new information may be added, etc.) through any combination of one or more channels including, inter alia, a SP's WWW facility, wireless messaging (SMS, MMS, etc.), E-Mail messages, IM exchanges, conventional mail, telephone, IVR facilities, etc.

To continue with our hypothetical example . . . as Mary goes about her daily activities there may arise numerous instances where she engages in transactions and would like to enhance the security of those transactions. For example:

1) Mary may wish to determine the balance of one of her (bank, brokerage, credit card, etc.) accounts.

2) Mary may wish to complete the payment portion of a purchase (from, for example, an on-line retailer, etc.).

3) Mary may wish to transfer money between various of her (bank, brokerage, credit card, etc.) accounts, transfer money from one of her (bank, brokerage, credit card, etc.) accounts to someone else, transfer money to someone else (perhaps another MS) with the amount of the transfer (along with, for example, charges, fees, etc.) appearing on her WC statement, etc.

The specific examples that were cataloged above are illustrative only and it will be readily apparent to one of ordinary skill in the relevant art that numerous other examples are easily possible and indeed are fully within the scope of the present invention.

Figure 4:
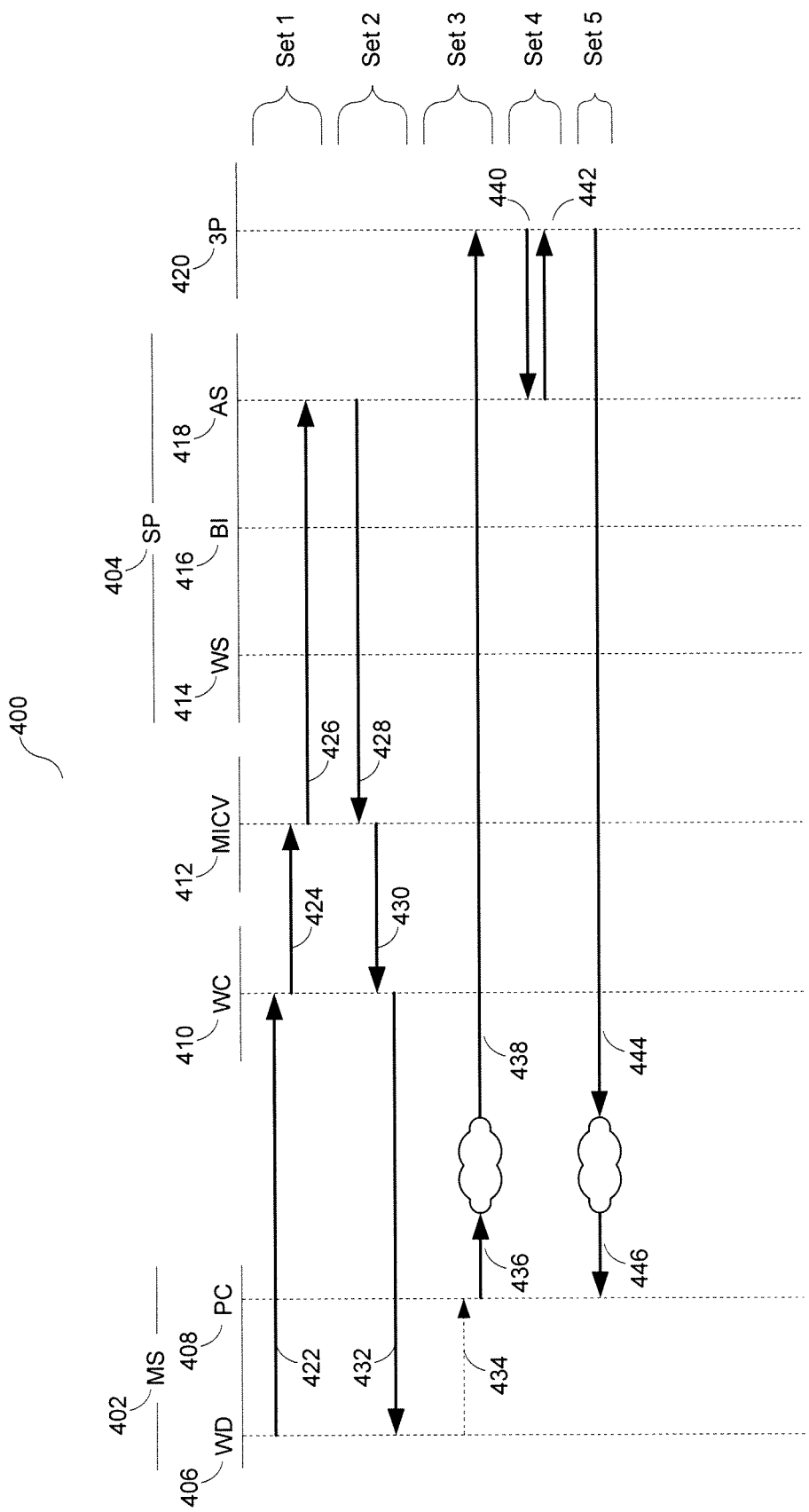
FIG. 4 illustrates various of the exchanges or interactions that are supported by aspects of the present invention.

FIG. 4 and reference numeral 400 provide a framework within which examples, such those cataloged above and others that would be readily apparent to one of ordinary skill in the relevant art, may be examined vis-à-vis aspects of the present invention. The entities that are depicted in FIG. 4 are the same as were depicted in, and described for, FIG. 3 with one exception:

MS 402 WD 406. For example, Mary's WD such as mobile telephone, BlackBerry, PalmPilot, etc.

MS 402 PC 408. For example, a home, work, etc. PC of Mary 402.

WC 410. The provider of service for a WD 406 of Mary 402.

MICV 412. As noted above the use of a MICV, although not required, provides significant advantages.

SP 404 WS 414. A publicly-available WWW site that is optionally provided by $SP_x$ 404.

SP 404 BI 416. A single, consolidated interface that $SP_x$ 404 may use to easily reach, possibly inter alia, one or more internal and/or external entities such as a credit card or debit card clearinghouse, a carrier billing system, a service bureau that provides access to multiple carrier billing systems, invoicing or billing facilities, etc.

SP 404 AS 418. Facilities that provide key elements of the instant invention (which will be described below).

Third Party (3P) 420. An organization such as, possibly inter alia, a utility company, a financial institution, an on-line retailer, an employer, etc.

In FIG. 4 the exchanges that are collected under the designation Set 1 represent the activities that might take place as Mary 402, perhaps in connection with or in anticipation of some type of transaction, composes on her WD 406 a (SMS, MMS, etc.) request message. In the instant example the request message is shown traveling through a MICV 412 and arriving at an AS 418 of $SP_x$ 404 (see 422→426). Mary's 402 request message 422 may be directed to any number of addresses (including, possibly inter alia, a SC, a TN, etc.).

A request message may, possibly inter alia, indicate a MS' desire for enhanced security within a transaction; contain various identification (e.g., account name, account number, etc.), authorization (e.g., access credentials, etc.), etc. artifacts; identify a specific 3P 420; etc.

The specific exchanges that were described above (as residing under the designation Set 1) are illustrative only and it will be readily apparent to one of ordinary skill in the relevant art that numerous other exchanges are easily possible and indeed are fully within the scope of the present invention.

In FIG. 4 the exchanges that are collected under the designation Set 2 represent the activities that might take place as an AS 418 of SP 404, possibly inter alia, (a) completes a series of processing steps and (b) dispatches one or more response (SMS, MMS, etc.) messages to Mary 402.

During its processing steps an AS 418 may employ any combination of a number of automated (e.g., through software solutions) and/or manual (e.g., through human intervention) actions, techniques, capabilities, etc., to possibly inter alia:

A) Extract one or more data elements from a received request and optionally perform various edit, validation, etc. operations on the extracted data element(s).

B) Leverage information that may have been previously collected from a MS during an optional registration process (such as, possibly inter alia, Identifying Information, Account Information, Security Service Information, Billing Information, etc.).

C) Leverage information that a SP may optionally maintain about a 3P (such as, possibly inter alia, definitional information, details concerning the 3P's security policies and procedures, etc.).

D) Apply one or more rules, bodies of logic, etc. (from for example a flexible, extensible, and dynamically configurable pool of same) to, possibly among other things, identify a MS, identify a 3P, identify all of the different security policies and procedures that might be applicable in the instant circumstance, etc.

E) Based on flexible, extensible, and dynamically configurable rules (that may govern, possibly inter alia, format, length, content, strength, etc.) generate, preserve, etc. an appropriate PIN. A PIN may be generated randomly, be derived from a predefined algorithm or formula, be generated sequentially from an internal base value, etc.

F) Interact with one or more external entities (such as, possible inter alia, a 3P, etc.) to for example exchange information with an entity's token, password, access, etc. service; update an entity; etc.

The catalog of processing steps that was described above is illustrative only and it will be readily apparent to one of ordinary skill in the relevant art that numerous other processing steps are easily possible and indeed are fully within the scope of the present invention.

Various of the techniques, strategies, capabilities, etc. that were described above may leverage one or more internal and/or external repositories such as, possibly inter alia, geographic data, demographic data, etc.

Each of the techniques, strategies, capabilities, etc. that were described above may have associated with it, possibly inter alia, an optional set of weighting, scoring, confidence, etc. factors that may be used, either individually or together, to develop results.

After completing its processing steps $SP_x$ 404 may, possibly inter alia, dispatch one or more response (SMS, MMS, etc.) messages to Mary's 402 WD 406 (428→432). In the instant example response messages are shown traversing a MICV 412.

A response message may contain, possibly inter alia, a PIN, descriptive or explanatory text, confirmation information, contact information, a request to call (e.g., a help center) at a particular TN, etc.

Mary 402 may optionally reply to a response message. Based on any received replies $SP_x$ 404 may optionally complete one or more additional processing steps.

During the activities that were described above an SP may offer any number of other optional services, capabilities, etc. including, possibly inter alia:

1) An SP may complete any number of billing transactions (of the type, nature, etc. described previously).

2) An SP may track a MS' usage, aggregate same, optionally offer (to the MS, to external entities such as a 3P, etc.) discounts, rebates, surcharges, etc. based on the tracked usage, etc.

The specific exchanges that were described above (as residing under the designation Set 2) are illustrative only and it will be readily apparent to one of ordinary skill in the relevant art that numerous other exchanges are easily possible and indeed are fully within the scope of the present invention.

In FIG. 4 the exchanges that are collected under the designation Set 3 represent the activities that might take place as Mary 402, after for example receiving a PIN via a response message 432, employs the PIN (via 434) to initiate, continue, etc. a transaction (via 436→438).

Mary 402 may use any combination of a range of mechanisms (including, possibly inter alia, manual entry, Near Field Communication [NFC], InfraRed [IR], Bluetooth, data transfer, etc.) to employ 434 the PIN.

The specific exchanges that were described above (as residing under the designation Set 3) are illustrative only and it will be readily apparent to one of ordinary skill in the relevant art that numerous other exchanges are easily possible and indeed are fully within the scope of the present invention. For example, Mary may optionally provide other information (including, for example, identification information, access credentials, etc.) during her initiation, continuance, etc. of a transaction (via 436→438).

In FIG. 4 the exchanges that are collected under the designation Set 4 represent the activities that might take place as 3P 420, possibly inter alia, interacts with AS 418 of $SP_x$ 404 to, possibly among other things, confirm, authenticate, etc. a received PIN (see 440→442).

The specific exchanges that were described above (as residing under the designation Set 4) are illustrative only and it will be readily apparent to one of ordinary skill in the relevant art that numerous other exchanges are easily possible and indeed are fully within the scope of the present invention.

In FIG. 4 the exchanges that are collected under the designation Set 5 represent the activities that might take place as 3P 420 continues, completes, etc. a transaction with Mary 402, provides confirmation to Mary 402, etc. (via 444→446, optionally incorporating possibly inter alia additional instances of the 436→438 and 444→446 exchanges).

The specific exchanges that were described above (as residing under the designation Set 5) are illustrative only and it will be readily apparent to one of ordinary skill in the relevant art that numerous other exchanges are easily possible and indeed are fully within the scope of the present invention.

The Set 1, Set 2, Set 3, Set 4, and Set 5 exchanges that were described above are illustrative only and it will be readily apparent to one of ordinary skill in the relevant art that numerous other exchanges are easily possible and indeed are fully within the scope of the present invention.

Figure 5:
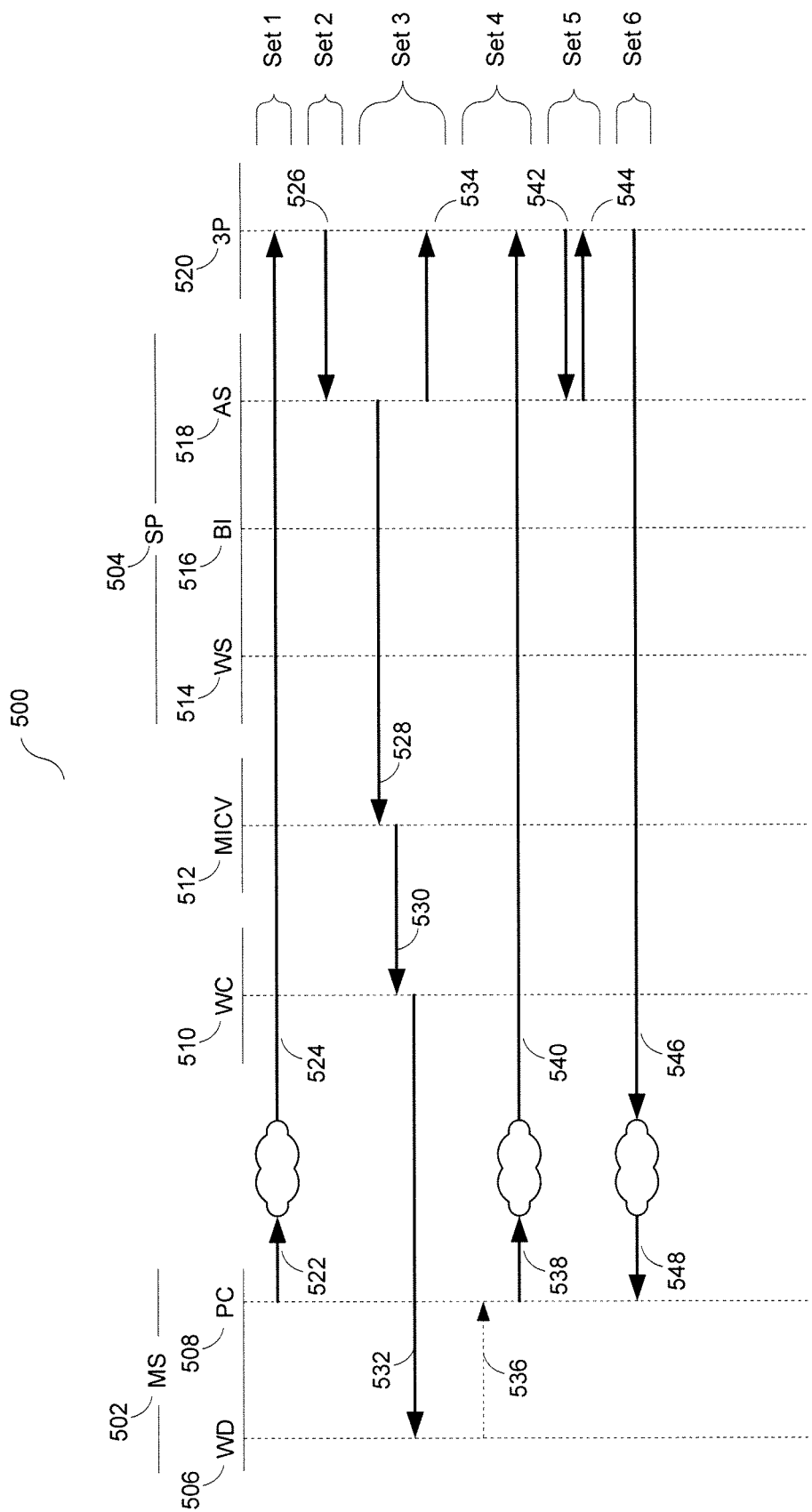
FIG. 5 illustrates additional exchanges or interactions that are supported by aspects of the present invention.

FIG. 5 and reference numeral 500 provide a framework within which other exemplary uses of aspects of the present invention may be examined. The entities that are depicted in FIG. 5 are the same as were depicted in, and described for, FIG. 4:

MS 502 WD 506. For example, Mary's WD such as mobile telephone, BlackBerry, PalmPilot, etc.

MS 502 PC 508. For example, a home, work, etc. PC of Mary 502.

WC 510. The provider of service for a WD 506 of Mary 502.

MICV 512. As noted above the use of a MICV, although not required, provides significant advantages.

SP 504 WS 514. A publicly-available WWW site that is optionally provided by $SP_x$ 504.

SP 504 BI 516. A single, consolidated interface that $SP_x$ 504 may use to easily reach, possibly inter alia, one or more internal and/or external entities such as a credit card or debit card clearinghouse, a carrier billing system, a service bureau that provides access to multiple carrier billing systems, invoicing or billing facilities, etc.

SP 504 AS 518. Facilities that provide key elements of the instant invention (which will be described below).

3P 520. An organization such as, possibly inter alia, a utility company, a financial institution, an on-line retailer, an employer, etc.

In FIG. 5 the exchanges that are collected under the designation Set 1 represent the activities that might take place as Mary 502 initiates, continues, etc. a transaction with a 3P 520 (via 522→524). Within this context Mary 502 may supply a range of information (including, for example, identification information, access credentials, an explicit request for enhanced transaction security, etc.).

The specific exchanges that were described above (as residing under the designation Set 1) are illustrative only and it will be readily apparent to one of ordinary skill in the relevant art that numerous other exchanges are easily possible and indeed are fully within the scope of the present invention.

In FIG. 5 the exchanges that are collected under the designation Set 2 represent the activities that might take place as 3P 520, possibly inter alia, interacts with AS 518 of $SP_x$ 504 to, possibly among other things, request enhanced transaction security (see 526).

The specific exchanges that were described above (as residing under the designation Set 2) are illustrative only and it will be readily apparent to one of ordinary skill in the relevant art that numerous other exchanges are easily possible and indeed are fully within the scope of the present invention.

In FIG. 5 the exchanges that are collected under the designation Set 3 represent the activities that might take place as $SP_x$ 504, possibly inter alia, (a) completes a series of processing steps, (b) dispatches one or more response (SMS, MMS, etc.) messages to Mary 502, and (c) optionally replies to 3P 520.

An illustrative catalog of processing steps was described above in connection with the discussion of Set 2 of FIG. 4.

After completing its processing steps $SP_x$ 504 may, possibly inter alia, dispatch one or more response (SMS, MMS, etc.) messages to Mary's 502 WD 506 (528→532). In the instant example response messages are shown traversing a MICV 512.

A response message may contain, possibly inter alia, a PIN, descriptive or explanatory text, confirmation information, contact information, a request to call (e.g., a help center) at a particular TN, etc.

Mary 502 may optionally reply to a response message. Based on any received replies $SP_x$ 504 may optionally complete one or more additional processing steps.

During the activities that were described above an SP may offer any number of other optional services, capabilities, etc. including, possibly inter alia:

1) An SP may complete any number of billing transactions (of the type, nature, etc. described previously).

2) An SP may track a MS' usage, aggregate same, optionally offer (to the MS, to external entities such as a 3P, etc.) discounts, rebates, surcharges, etc. based on the tracked usage, etc.

After dispatching any response messages $SP_x$ 504 may, possibly inter alia, optionally reply to 3P 520 (via 534).

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 5 the exchanges that are collected under the designation Set 4 represent the activities that might take place as Mary 502, after for example receiving a PIN via a response message 532, employs the PIN (via 536) to initiate, continue, etc. a transaction (via 538→540).

Mary 502 may use any combination of a range of mechanisms (including, possibly inter alia, manual entry, NFC, IR, Bluetooth, data transfer, etc.) to employ 536 the PIN.

The specific exchanges that were described above (as residing under the designation Set 4) are illustrative only and it will be readily apparent to one of ordinary skill in the relevant art that numerous other exchanges are easily possible and indeed are fully within the scope of the present invention.

In FIG. 5 the exchanges that are collected under the designation Set 5 represent the activities that might take place as 3P 520, possibly inter alia, interacts with AS 518 of $SP_x$ 504 to, possibly among other things, confirm, authenticate, etc. a received PIN (see 542→544).

The specific exchanges that were described above (as residing under the designation Set 5) are illustrative only and it will be readily apparent to one of ordinary skill in the relevant art that numerous other exchanges are easily possible and indeed are fully within the scope of the present invention.

In FIG. 5 the exchanges that are collected under the designation Set 6 represent the activities that might take place as 3P 520 continues, completes, etc. a transaction with Mary 502, provides confirmation to Mary 502, etc. (via 546→548, optionally incorporating possibly inter alia additional instances of the 538→540 and 546→548 exchanges).

The specific exchanges that were described above (as residing under the designation Set 5) are illustrative only and it will be readily apparent to one of ordinary skill in the relevant art that numerous other exchanges are easily possible and indeed are fully within the scope of the present invention.

The Set 1, Set 2, Set 3, Set 4, Set 5, and Set 6 exchanges that were described above are illustrative only and it will be readily apparent to one of ordinary skill in the relevant art that numerous other exchanges are easily possible and indeed are fully within the scope of the present invention.

Under the illustrative frameworks that were presented through FIG. 4 and FIG. 5 numerous alternative exchanges, arrangements, etc. are easily possible, including possibly inter alia:

1) A MS may optionally need to acknowledge a response message (by, for example, replying to same) to activate or otherwise confirm a PIN. Such an acknowledgement may optionally need to occur within a defined period of time (after which an unacknowledged PIN may, possibly inter alia, go 'stale' and not be usable).

2) A PIN may optionally be designated as being single-use, multi-use, etc.

3) A PIN may optionally carry a lifetime indicator. Such a value may identify a specific period of time (e.g., from a beginning date and time to an ending date and time) during which a PIN may be usable; identify a specific number of uses or invocations after which a PIN may go 'stale' and not be usable; identify a cumulative transaction amount (e.g., in a currency such as dollars) beyond which a PIN may go 'stale' and not be usable; etc.

4) A SP may incorporate additional factors, criteria, tests, etc. during various of its processing activities (e.g., the confirmation, authentication, etc. of a PIN; etc.) including possibly inter alia MS Location-Based Service (LBS) and/or Global Positioning System (GPS) information, biometric information, etc.

The confirmation, response, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS, GPS, etc. facility).

The confirmation, response, etc. message(s) that were identified above may optionally contain advertising—e.g., textual material if an SMS model is being utilized, or multimedia (images of brand logos, sound, video snippets, etc.) material if an MMS model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS, GPS, etc. facility).

The confirmation, response, etc. message(s) that were identified above may optionally contain promotional materials (e.g., still images, video clips, etc.).

Figure 6:
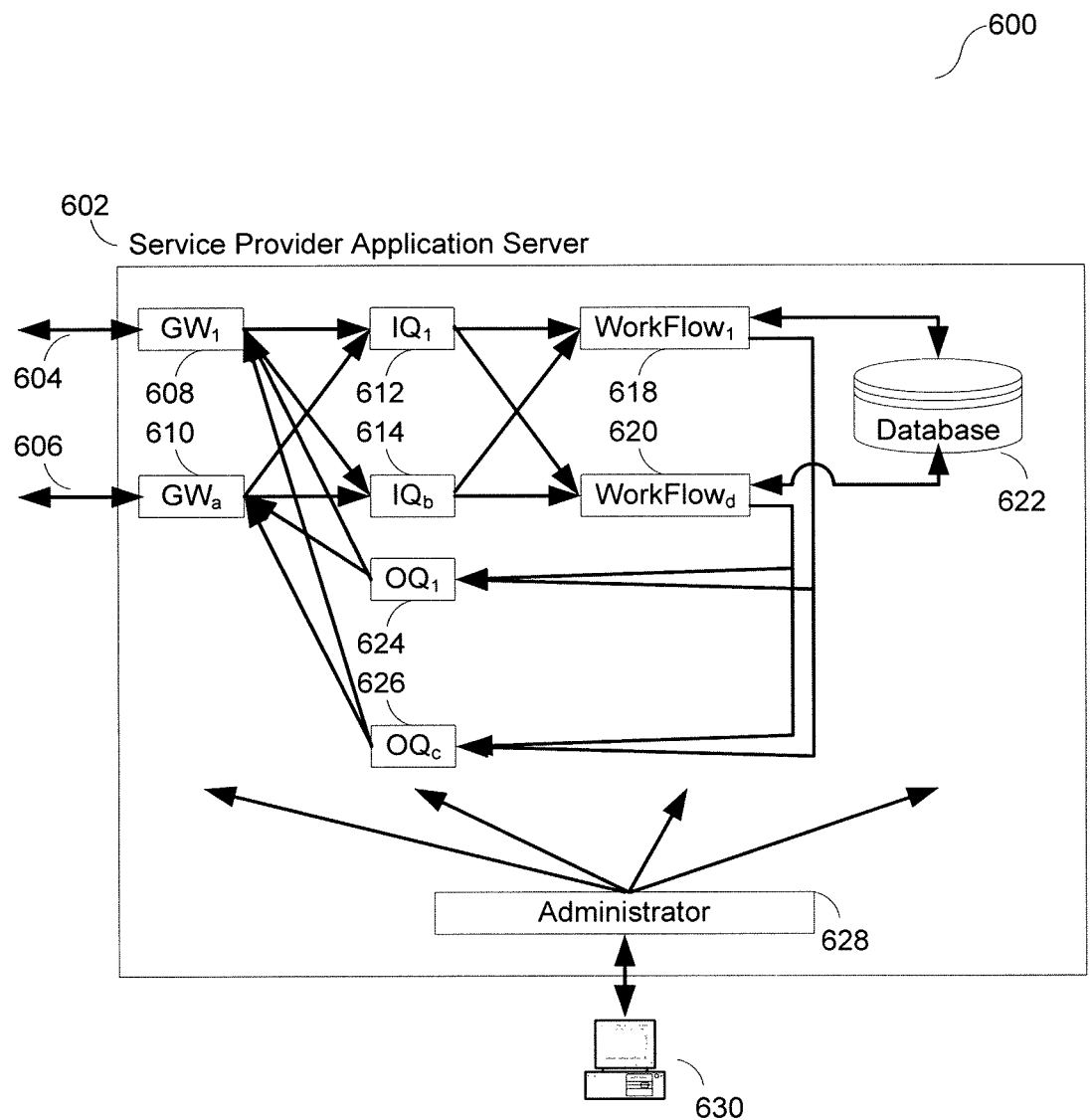
FIG. 6 is a diagrammatic presentation of aspects of an exemplary Service Provider (SP) Application Server (AS).

FIG. 6 and reference numeral 600 provides a diagrammatic presentation of aspects of an exemplary SP AS 602. The illustrated AS 602 contains several key components—Gateways (GW$_1$ 608→GW$_a$ 610 in the diagram), Incoming Queues (IQ$_1$ 612→IQ$_b$ 614 in the diagram), WorkFlows (WorkFlow$_1$ 618→WorkFlow$_d$ 620 in the diagram), Database 622, Outgoing Queues (OQ$_1$ 624→OQ$_c$ 626 in the diagram), and an Administrator 628. It will be readily apparent to one of ordinary skill in the relevant art that numerous other components are possible within an AS 602.

A dynamically updateable set of one or more Gateways (GW$_1$ 608→GW$_a$ 610 in the diagram) handle incoming (SMS/MMS/etc. messaging, etc.) traffic 604→606 and outgoing (SMS/MMS/etc. messaging, etc.) traffic 604→606. Incoming traffic 604→606 is accepted and deposited on an intermediate or temporary Incoming Queue (IQ$_1$ 612→IQ$_b$ 614 in the diagram) for subsequent processing. Processed artifacts are removed from an intermediate or temporary Outgoing Queue (OQ$_1$ 624→OQ$_c$ 626 in the diagram) and then dispatched 604→606.

A dynamically updateable set of one or more Incoming Queues (IQ$_1$ 612→IQ$_b$ 614 in the diagram) and a dynamically updateable set of one or more Outgoing Queues (OQ$_1$ 624→OQ$_c$ 626 in the diagram) operate as intermediate or temporary buffers for incoming 604→606 and outgoing traffic 604→606.

A dynamically updateable set of one or more WorkFlows (WorkFlow$_1$ 618→WorkFlow$_d$ 620 in the diagram) remove incoming traffic 604→606 from an intermediate or temporary Incoming Queue (IQ$_1$ 612→IQ$_b$ 614 in the diagram), perform all of the required processing operations, and deposit processed artifacts on an intermediate or temporary Outgoing Queue (OQ$_1$ 624→OQ$_c$ 626 in the diagram). The WorkFlow component will be described more fully below.

The Database 622 that is depicted in FIG. 6 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 628 that is depicted in FIG. 6 provides management or administrative control over all of the different components of an AS 602 through, as one example, a WWW-based interface 630. It will be readily apparent to one of ordinary skill in the relevant art that numerous other interfaces (e.g., a data feed, an Application Programming Interface [API], etc.) are easily possible.

Through flexible, extensible, and dynamically updatable configuration information a WorkFlow component may be quickly and easily realized to support any number of activities. For example, WorkFlows might be configured to support a registration process; to support interactions with external entities; to support various internal processing steps (as described above) including, possibly inter alia, (1) the evaluation of received request messages, (2) the generation of PIN values, and (3) the generation and dispatch of response messages; to support the generation and dispatch of confirmation, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

It is important to note that while aspects of the discussion that was presented above referenced the use of SCs and TNs it will be readily apparent to one of ordinary skill in the relevant art that other message address identifiers are equally applicable and, indeed, are fully within the scope of the present invention.

The discussion that was just presented referenced two specific wireless messaging paradigms—SMS and MMS. These paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that other paradigms (such as, for example, Internet Protocol [IP] Multimedia Subsystem [IMS], IM, E-Mail, Wireless Application Protocol [WAP], etc.) are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| API | Application Programming Interface |
| AS | Application Server |
| ATMIA | ATM Industry Association |
| BI | Billing Interface |
| CIMIP | Center for Identity Management and Information Protection |
| CSC | Common Short Code |
| DBMS | Database Management System |
| E-Mail | Electronic Mail |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IR | Infrared |
| IVR | Interactive Voice Response |
| LBS | Location-Based Service |
| MICV | Messaging Inter-Carrier Vendor |
| MMS | Multimedia Message Service |
| MS | Mobile Subscriber |
| NFC | Near Field Communication |
| ODBMS | Object Database Management System |
| OQ | Outgoing Queue |
| PC | Personal Computer |

-continued

| Acronym | Meaning |
|---|---|
| PIN | Personal Identification Number |
| RDBMS | Relational Database Management System |
| SC | Short Code |
| SMS | Short Message Service |
| SP | Service Provider |
| 3P | Third Party |
| TN | Telephone Number |
| WAP | Wireless Application Protocol |
| WC | Wireless Carrier |
| WD | Wireless Device |
| WF | WorkFlow |
| WS | Web Server |
| WWW | World-Wide Web |

What is claimed is:

1. A method for enhanced transaction security, comprising:
at a gateway device, receiving from a wireless device of a mobile subscriber a request message, the request message indicative of a transaction involving a third-party and identifying the third party as a retailer with whom a payment portion of a purchase is to be completed;
performing at least one processing step on aspects of the request message, using at least (a) information from the request message, (b) registration information previously supplied by the mobile subscriber, and (c) information previously obtained about the third-party, yielding one or more security policies;
generating, based at least on aspects of the one or more security policies, a Personal Identification Number (PIN);
preserving at least the PIN in a repository; and
generating and sending a response message to the mobile subscriber, the response message containing at least the PIN,
wherein the PIN is employed to initiate the transaction involving the third-party.

2. The method of claim 1, wherein the request message and the response message are each one of (a) a Short Message Service message, (b) a Multimedia Message Service message, (c) an IP Multimedia Subsystem message, or (d) an E-Mail message.

3. The method of claim 1, wherein the registration information is defined by the mobile subscriber during a registration process.

4. The method of claim 3, wherein the registration information includes at least one of (a) Identifying Information, (b) Account Information, (c) Security Service Information, and (d) Billing Information.

5. The method of claim 3, wherein the registration process includes a billing component.

6. The method of claim 1, wherein the PIN is developed through one of (a) random generation, (b) a predefined algorithm or formula, or (c) sequential generation.

7. The method of claim 1, further comprising:
use by the mobile subscriber of the PIN in the transaction.

8. The method of claim 4, wherein the use involves one of (a) manual entry, (b) Near Field Communication, (c) infrared communication, or (d) BlueTooth communication.

9. The method of claim 4, further comprising:
interaction by the third-party with the repository to at least confirm the PIN.

10. The method of claim 1, wherein performing at least one processing step on aspects of the request message further comprises using at least information concerning security policies and procedures of the third party.

11. The method of claim 1, further comprising tracking the usage by the mobile subscriber and offering discounts to the mobile subscriber based on the usage.

12. The method of claim 1, further comprising receiving, from the mobile subscriber, a reply to the response message that activates the PIN.

13. The method of claim 1, further comprising receiving, from the mobile subscriber, a reply message to the response message that confirms the PIN.

14. The method of claim 1, further comprising designating the PIN as single-use.

15. The method of claim 1, further comprising designating the PIN as multi-use.

16. The method of claim 1, wherein the PIN carries a lifetime indicator.

17. The method of claim 16, wherein the lifetime indicator identifies a predetermined period of time during which the PIN is usable.

18. The method of claim 16, wherein the lifetime indicator identifies a specific number of uses.

19. The method of claim 16, wherein the lifetime indicator identifies a cumulative transaction amount beyond which the PIN is not usable.

* * * * *